(12) United States Patent
Hofmann

(10) Patent No.: US 6,502,353 B2
(45) Date of Patent: Jan. 7, 2003

(54) ROOF COVERING AND ITS METHOD OF MAKING AND USING, COMPRISING A RIB MESH CORRUGATED WITH AT LEAST ONE OUTER LAYER, THE GENERALLY PARALLEL CORRUGATIONS PERMITTING DEFORMATION WITHOUT RESTORING CREEP

(75) Inventor: Karl-Heinz Hofmann, Mücke (DE)

(73) Assignee: Lafarge Braas Roofing Accessories GmbH & Co. KG, Oberursel (DE)

(*) Notice: Subject to any disclaimer, the term of this patent is extended or adjusted under 35 U.S.C. 154(b) by 0 days.

(21) Appl. No.: 09/789,399

(22) Filed: Feb. 20, 2001

(65) Prior Publication Data
US 2002/0066238 A1 Jun. 6, 2002

Related U.S. Application Data

(63) Continuation of application No. 08/996,827, filed as application No. PCT/DE96/01189 on Dec. 23, 1997, now Pat. No. 6,258,439.

(30) Foreign Application Priority Data
Jun. 30, 1995 (DE) .......................................... 195 23 834

(51) Int. Cl.⁷ ................................................. E04D 1/36
(52) U.S. Cl. .......................... 52/58; 52/408; 52/746.11; 428/152

(58) Field of Search ....................... 52/58, 408, 746.11; 428/138, 152, 181, 182; 442/48, 35, 36

(56) References Cited

U.S. PATENT DOCUMENTS

| 4,287,248 A | 9/1981 | Gessner et al. |
| 5,002,816 A | 3/1991 | Hofmann et al. |
| 5,030,507 A | 7/1991 | Mudge et al. |
| 5,370,756 A | 12/1994 | Buis et al. |

FOREIGN PATENT DOCUMENTS

| DE | 3642063 | 7/1987 |
| DE | 4333247 | 4/1995 |
| EP | 0038222 | 10/1981 |
| EP | 0341343 | 11/1989 |
| GB | 2184685 | 7/1987 |
| NL | 8902798 | 6/1991 |
| WO | 9528536 | 10/1995 |
| WO | 9531620 | 11/1995 |

Primary Examiner—Carl D. Friedman
Assistant Examiner—Naoko Slack
(74) Attorney, Agent, or Firm—Nils H. Ljungman & Associates

(57) ABSTRACT

The present invention relates to a building having a roof with structured roof tiles and a structure projecting out from the roof surface, such as a chimney, a window, a wall, or ventilating pipe and to a method of constructing a roof of a building covered with structured roofing tiles and a structure projecting out from the roof surface, such as a chimney, a window, a wall, or ventilating pipe and also the gap between a ridge, an arris or hip covering.

24 Claims, 4 Drawing Sheets

ROOF COVERING AND ITS METHOD OF MAKING AND USING, COMPRISING A RIB MESH CORRUGATED WITH AT LEAST ONE OUTER LAYER, THE GENERALLY PARALLEL CORRUGATIONS PERMITTING DEFORMATION WITHOUT RESTORING CREEP

This application is a continuation of U.S. application Ser. No. 08/996,827, filed on Dec. 23, 1997 now U.S. Pat. No. 6,258,439 which is based of PCT/DE96/01189 filed Jun. 27, 1996.

BACKGROUND OF THE INVENTION

1. Field of the Invention

The present invention relates to a building having a roof with structured roof tiles and a structure projecting out from the roof surface, such as a chimney, a window, a wall, or ventilating pipe and to a method of constructing a roof of a building covered with structured roofing tiles and a structure projecting out from the roof surface, such as a chimney, a window, a wall, or ventilating pipe and also the gap between a ridge, an arris or hip covering.

2. Background Information

Methods are known for constructing a roof of a building covered with structured roofing tiles and a structure projecting out from the roof surface, such as a chimney, a window, a wall, or ventilating pipe and also the gap between a ridge, an arris or hip covering which covers the surface of the roof of a building covered with structured roofing tiles and a structure projecting out from the roof surface, such as a chimney, a window, a wall, or ventilating pipe, and also the gap between a ridge, an arris or hip, etc. In these cases the surface of the roof of a building covered with structured roofing tiles and a structure projecting out from the roof surface, such as a chimney, a window, a wall, or ventilating pipe, and also the gap between a ridge, an arris or hip, etc., the area between an essentially planar surface or straight edge and a three-dimensional structured surface must be covered whereby the three-dimensional, structured surface is larger than its projection into the plane. The covering must therefore be extendable in at least that region abutting the three-dimensional, structured surface.

Upon constructing a roof of a building covered with structured roofing tiles and a structure projecting out from the roof surface, such as a chimney, a window, a wall, or ventilating pipe and also the gap between a ridge, an arris or hip covering, such covering material in the form of sheets, strips or widths is required as covering on the roof of a building, for example, to seal the gap between the surface of the roof covered with structured roofing tiles and a structure projecting out from the roof surface, such as a chimney, a window, a wall, or ventilating pipe, or also the gap between a ridge, an arris or hip, etc. In these cases, the gap between an essentially planar surface or straight edge and a three-dimensional structured surface must be covered so as to be water-tight, whereby the three-dimensional, structured surface is larger than its projection into the plane. The covering must therefore be extendable in at least that region abutting the three-dimensional, structured surface.

U.S. Pat. No. 5,377,459 discloses a ridge cover also useable as a shingle having a three dimensional appearance much like shake, together with methods of making and using the same. In one embodiment, right isosceles triangular pieces of asphalt composition roofing material are cut. Thereafter, the material on each side of the center line bisecting the right angle is folded under the top surface of the asphalt composition material a plurality of times in a Z-fold manner along lines approximately parallel to the center line to effectively progressively thicken the material at the respective side of the center line, the folding pattern for the two sides being symmetrical with each other. In manufacture, the triangle shaped pieces may be cut from a roll of material with no waste, may be progressively folded, stacked for shipment in a substantially solid stack, easily bent over a ridge during installation, and nailed into position utilizing hidden nails to obtain double coverage on hip and ridges in a manner simulating the outline of a heavy wood shape hip and ridge cover. The symmetry of the cover makes the same also useful as a shingle for a pronounced three dimensional hidden nail double coverage installation.

U.S. Pat. No. 5,440,855 discloses roofing components and method for pitched roofs includes a flexible base and one or more ranks of integrally formed thin blades, vanes or fins extending outwardly from the base. The blades, fins or vanes are spaced substantially parallel to each other and overlap to shadow lower elements and to provide air circulation and between blades, which are designed to sluff-off heat and impede thermal energy being transmitted to the roof. The blades, fins or vanes are flexible and resilient so as to absorb the impact of falling material (limbs, etc.). One edge portion of the base is free of blades to provide an overlapped area for installation on a pitched roof. Various overlapping and interlocking arrangements are disclosed for sealing purposes.

U.S. Pat. No. 5,426,898 discloses a lead-free plate-shaped roof flashing material comprises a sandwich structure in which a stress damping and stabilizing layer of ductile material is completely covered on one side and at least partly covered on the other side by preferably metallic foil sheetings, e.g. of aluminum foil, designed with densely positioned flattened folded sections having such a form, e.g. closed inverted pleats, that a material layer of each folded section gets into contact with the stress damping and stabilizing layer only when the folded sections open in connection with deforming the flashing material to make it fit to the roofing.

DE-A 36 42 063 discloses a covering material having a rib mesh embedded in polyisobutylene as a substrate. When this covering material is extended, the diamond meshes of the substrate deform, whereby the height and aperture of a mesh change in inverse proportion to one another while the lateral lengths remain the same. At the same time, the area of a mesh changes so that the embedding compound is severely deformed and, due to its elastic properties, exerts a restoring force on the rib mesh. This known covering material therefore exhibits undesirable creep, in particular following severe extension.

OBJECT OF THE INVENTION

The object of the present invention is to create an economical covering material for covering the gap between a planar surface and a structured surface, in particular a highly structured roof surface, which material can be extended in at least one direction more than 30%, can be bent perpendicular to the direction of extension, and the entire surface of which covering material can be permanently deformed in three dimensions.

SUMMARY OF THE INVENTION

To achieve this object, the present invention teaches that the thin flat stock is, at least in the direction opposite the direction of extension, compressed, crepe-like, by at least 25% of its original length so that the surface of the covering material exhibits irregular little corrugations.

As a result of the compression opposite the direction of extension, the covering material can easily be extended in the direction of extension to its original length. The covering material is compressed, crepe-like, by at least that length by which it is to later be extended or extendable. The covering material is preferably compressed by approximately 30–50% of its original length, so that when extended to its original length, it is about 1.5 to 2 times its as-delivered length. The covering material can therefore easily be extended up to 100% of its length, i.e. by a significantly greater amount than can known covering materials. The covering material can be compressed both vertically and horizontally, so that it can be extended in any direction.

One aspect of the invention relates to a building having a roof, the building comprising walls and a roof which is supported by the walls, the roof having sculptured roofing tiles, which form a three dimensional structured surface disposed on the roof, a structure projecting out of a roof, such as a chimney, a window, a wall, or ventilating pipe, a gap between the roof and the structure projecting out from the roofing surface, a rib mesh, having openings and a covering, that covers the openings on at least one side of the rib mesh, being disposed over a gap between the surface of the roof covered with structured roofing tiles and the structure projecting out from the roof surface, the rib mesh being covered with irregular corrugations having irregular lengths which irregular corrugations are shorter than the width of the rib mesh and which irregular corrugations are irregularly spaced, crepe like, from one another, the rib mesh being disposed against the structured roofing tiles on the roof and against the structure projecting out from the roof surface, a first width edge of the rib mesh being disposed against the structure projecting out from the roof and covering the gap between the surfaces of the roof covered with the structured roofing tiles and the structure projecting out from the roof surface, a second width edge of the rib mesh being disposed against the roof and covering the gap between the surfaces of the roof covered with the structured roofing tiles and the structure projecting out from the roof surface, and the corrugated rib mesh comprising a rib mesh deformed by hand, the irregularly spaced hand deformed corrugations having irregular lengths and lying against the structured roofing tiles on the roof and against the structure projecting out from the roof surface, the deformed portions of corrugations being configured to extend at least a portion of the length of the corrugations, at least a portion of the mesh being extended a substantial percentage of the original length of the rib mesh along at least one direction of the rib mesh, the rib mesh being permanently deformed by hand in at least one direction, the crepe like rib mesh being permanently extended, the crepe like corrugations being compressed irregularly, the short corrugations being deformed and elongated in one direction without affecting the direction perpendicular to the one direction, and the rib mesh being extended without a restoring force being set up in the deformed by hand rib mesh, thus avoiding restoring creep in the mesh.

Another aspect of the invention relates to the building having a roof covered with structured roofing tiles and a structure projecting out from the roof surface wherein the expanded rib mesh comprises expanded rib mesh having been expanded a substantial portion of its initial length upon the irregular corrugations having been expanded by hand.

A further aspect of the invention relates to the building having a roof covered with structured roofing tiles and a structure projecting out from the roof surface wherein the crepe like rib mesh is compressed in the direction opposite the direction of extension prior to installation on the roof.

Yet another aspect of the invention relates to the building having a roof covered with structured roofing tiles and a structure projecting out from the roof surface wherein the substrate is configured to have an initial length before compression of the substrate in the direction opposite the direction of extension, and the substrate is compressed at least 25% of the initial length of the rib mesh in the direction opposite the direction of extension prior to installation on the roof.

Still another aspect of the invention relates to the building having a roof covered with structured roofing tiles and a structure projecting out from the roof surface wherein the layer of material comprises a substantially flat stock.

Another feature of the invention relates to the building having a roof covered with structured roofing tiles and a structure projecting out from the roof surface wherein the covering having been compressed prior to installation on the roof.

Yet another feature of the invention relates to the building having a roof covered with structured roofing tiles and a structure projecting out from the roof surface wherein the covering comprises an air permeable and liquid repellant material.

Still another feature of the invention relates to the building having a roof covered with structured roofing tiles and a structure projecting out from the roof surface wherein the covering comprises a first layer disposed on a first side of the mesh, and comprising a second layer disposed on a second side of the mesh, the second layer of material is disposed on the second side of the substrate, irregularly corrugating the first layer from substantially flat stock, irregularly corrugating the second layer from substantially flat stock, and irregularly corrugating the mesh together with the first and the second layer.

A further feature of the invention relates to the building having a roof covered with structured roofing tiles and a structure projecting out from the roof surface wherein, the plurality of openings in the mesh are disposed between the first layer and the second layer, and the mesh comprises means for connecting the first layer and the second layer.

Another aspect of the invention relates to the building having a roof covered with structured roofing tiles and a structure projecting out from the roof surface wherein, the substrate comprises a rib mesh, and the rib mesh comprises aluminum.

Yet another aspect of the invention relates to the building having a roof covered with structured roofing tiles and a structure projecting out from the roof surface wherein, the covering comprises a first layer disposed on a first side of the mesh, and comprising a second layer disposed on a second side of the mesh, the second layer of material is disposed on the second side of the substrate, the first layer having been irregularly corrugated from substantially flat stock, the second layer having been irregularly corrugated from substantially flat stock, and the mesh having been irregularly corrugated together with the first and the second layer.

Still another aspect of the invention relates to a method of constructing a building having a roof covered with structured roofing tiles, which form a three dimensional structured surface, and a structure projecting out from the roof surface, such as a chimney, a window, a wall, or ventilating pipe, the building comprises walls and a roof which is supported by the walls, the roof having sculptured roofing tiles disposed thereon, a structure projecting out of the roof, such as a chimney, a window, a wall, or ventilating pipe, a gap between the roof and the structure projecting out from the roofing surface, a rib mesh, having openings and a covering, that covers the openings on at least one side of the rib mesh, being disposed over the gap between the surface of the roof covered with structured roofing tiles and the structure protecting out from the roof surface, the rib mesh being covered with irregular corrugations having irregular lengths which irregular corrugations are shorter than the width of the rib mesh and which are irregularly spaced, crepe like, from one another, the rib mesh being disposed against the structured roofing tiles on the roof and against the structure projecting out from the roof surface, a first width edge of the rib mesh being disposed against the structure projecting out from the roof and covering the gap between the surfaces of the roof covered with the structured roofing tiles and the structure projecting out from the roof surface, a second width edge of the rib mesh being disposed against the roof and covering the gap between the surfaces of the roof covered with the structured roofing tiles and the structure projecting out from the roof surface, and the corrugated rib mesh comprising a rib mesh deformed by hand, the irregularly spaced hand deformed corrugations having irregular lengths and lying against the structured roofing tiles on the roof and against the structure projecting out from the roof surface, the deformed portions of corrugations being configured to extend at least a portion of the length of the corrugations, at least a portion of the mesh being extended a substantial percentage of the original length of the rib mesh along at least one direction of the rib mesh, the rib mesh being permanently deformed by hand in at least one direction, the crepe like rib mesh being permanently extended, the crepe like corrugations being compressed irregularly, the short corrugations being deformed and elongated in one direction without affecting the direction perpendicular to the one direction, and the rib mesh being extended without a restoring force being set up in the deformed by hand rib mesh, thus avoiding restoring creep in the mesh, the method also comprising placing a width of a rib mesh, having openings and a covering that covers the openings on at least one side of the rib mesh, over a gap between the surface of the roof covered with structured roofing tiles and a structure projecting out from the roof surface and the rib mesh being covered with irregular corrugations having irregular lengths which irregular corrugations are shorter than the width of the rib mesh and which are irregularly spaced, crepe like, from one another, against the structured roofing tiles on the roof and against the structure projecting out from the roof surface, placing a first width edge of the rib mesh against the structure projecting out from the roof and covering the gap between the surface of the roof covered with structured roofing tiles, which form a three dimensional structured surface and the structure projecting out from the roof surface substantially simultaneously, placing a second width edge of the rib mesh against the roof and covering the gap between the surface of the roof covered with structured roofing tiles and a structure projecting out from the roof surface substantially simultaneously, and deforming the corrugated rib mesh by hand by deforming the irregularly spaced corrugations having irregular lengths, by deforming the irregular corrugations to extend at least a portion of the corrugations, and extend at least a corresponding portion of the mesh a substantial percentage of the original length of the rib mesh along at least one direction of the rib mesh and thus permanently deforming the rib mesh by hand in at least one direction and expanding the crepe like mesh permanently by extending the crepe like compressed irregular and short corrugations in one direction without affecting the direction perpendicular to the one direction, and without a restoring force being set up in the mesh which mesh was deformed by hand, thus avoiding restoring creep in the mesh.

Still another aspect of the invention relates to the method of constructing a building having a roof covered with structured roofing tiles, which form a three dimensional structured surface, and a structure projecting out from the roof surface, such as a chimney, a window, a wall, or ventilating pipe wherein the expanding comprising expanding at least a portion of the corrugated, crepe like mesh a substantial portion of its initial length by expanding the irregular corrugations by hand.

A further feature of the invention relates to the method of constructing a building having a roof covered with structured roofing tiles, which form a three dimensional structured surface, and a structure projecting out from the roof surface, such as a chimney, a window, a wall, or ventilating pipe including compressing the crepe like rib mesh in the direction opposite the direction of extension prior to installation on the roof.

Another feature of the invention relates to the method of constructing a building having a roof covered with structured roofing tiles, which form a three dimensional structured surface, and a structure projecting out from the roof surface, such as a chimney, a window, a wall, or ventilating pipe wherein the substrate is configured to have an initial length before compression of the substrate in the direction opposite the direction of extension, and compressing at least 25% of the initial length of the rib mesh in the direction opposite the direction of extension prior to installation on the roof.

Still another feature of the invention relates to the method of constructing a building having a roof covered with structured roofing tiles, which form a three dimensional structured surface, and a structure projecting out from the roof surface, such as a chimney, a window, a wall, or ventilating pipe wherein the layer of material comprises a substantially flat stock.

Yet another feature of the invention relates to the method of constructing a building having a roof covered with structured roofing tiles, which form a three dimensional structured surface, and a structure projecting out from the roof surface, such as a chimney, a window, a wall, or ventilating pipe including compressing the covering from a substantially flat stock while mounted on the rib mesh prior to installation on the roof.

A further feature of the invention relates to the method of constructing a building having a roof covered with structured roofing tiles, which form a three dimensional structured surface, and a structure projecting out from the roof surface, such as a chimney, a window, a wall, or ventilating pipe wherein compressing the covering from comprises an air permeable and liquid repellant material.

Another aspect of the invention relates to the method of constructing a building having a roof covered with structured roofing tiles, which form a three dimensional structured surface, and a structure projecting out from the roof surface, such as a chimney, a window, a wall, or ventilating pipe wherein the covering comprises a first layer disposed on a first side of the mesh, and comprising a second layer disposed on a second side of the mesh, the second layer of material is disposed on the second side of the substrate, irregularly corrugating the first layer from substantially flat stock, irregularly corrugating the second layer from substantially flat stock, and irregularly corrugating the mesh together with the first and the second layer.

Yet another aspect of the invention relates to the method of constructing a building having a roof covered with structured roofing tiles, which form a three dimensional structured surface, and a structure projecting out from the roof surface, such as a chimney, a window, a wall, or ventilating pipe wherein the plurality of openings in the mesh are disposed between the first layer and the second layer, and the mesh comprises means for connecting the first layer and the second layer.

A further feature of the invention relates to the method of constructing a building having a roof covered with structured roofing tiles, which form a three dimensional structured surface, and a structure projecting out from the roof surface, such as a chimney, a window, a wall, or ventilating pipe wherein the substrate comprises a rib mesh, and the rib mesh comprises aluminum.

Another aspect of the invention relates to the building roof covering for covering a roof of a building covered with structured roofing tiles, which form a three dimensional structured roof surface, and a structure projecting out from the roof surface, such as a chimney, a window, a wall, or ventilating pipe, the building roof covering comprising a mesh for covering a gap between a roof which is supported by walls, which roof has sculptured roofing tiles, which tiles form a three dimensional structured surface disposed on a roof, and a structure projecting out of a roof, such as a chimney, a window, a wall, or ventilating pipe, the mesh, having openings and a covering, that covers the openings on at least one side of the mesh, the mesh being configured to be disposed over a gap between the surface of a roof covered with structured roofing tiles and a structure projecting out from a roof surface, such as a chimney, a window, a wall, or ventilating pipe, the mesh being covered with irregular corrugations having irregular lengths which irregular corrugations are shorter than the width of the mesh and which irregular corrugations are irregularly spaced, crepe like, from one another, the mesh being configured to be disposed against a structured roofing tile on a roof and against a structure projecting out from a roof surface, such as a chimney, a window, a wall, or ventilating pipe, a first width edge of the covering being configured to be disposed against a structure projecting out from a roof and covering a gap between the surfaces of a roof covered with structured roofing tiles and a structure projecting out from a roof surface, a second width edge of the covering being configured to be disposed against a roof and covering a gap between the surfaces of a roof covered with structured roofing tiles and a structure projecting out from the roof surface, and the corrugated mesh comprising a mesh configured to be deformed by hand, the irregularly spaced corrugations having irregular lengths and configured to lie against the structured roofing tiles on the roof and against the structure projecting out from the roof surface, the corrugated mesh being configured to be deformable and being configured to be extendable upon deformation by hand, the mesh being configured to be extendable at least a portion of a substantial percentage of the original length of the mesh along at least one direction of the mesh, the mesh being configured to be permanently deformed by hand in at least one direction, the crepe like mesh being configured to be permanently extended upon being deformed by hand, the short corrugations being configured to be deformed and being configured to be elongated in one direction without affecting the direction perpendicular to the one direction, and the mesh being configured to be extended without a restoring force being set up in the deformed by hand mesh, thus avoiding restoring creep in the mesh.

Yet another aspect of the invention relates to the building roof covering for covering a roof of a building, the building roof covering comprising a layer, having openings and a covering, that covers the openings on at least one side of the layer, the layer being covered with irregular corrugations having irregular lengths which irregular corrugations are shorter than the width of the layer and which irregular corrugations are irregularly spaced, crepe like, from one another, the corrugated layer comprising a layer configured to be deformed by hand, and the corrugated layer being configured to be extendable at least a portion of a substantial percentage of the original length of the layer along at least one direction of the layer, and being configured to be permanently deformable and extendable in the at least one direction of the layer and being configured to be extended upon deformation by hand.

A further aspect of the invention relates to the method of covering the gap between the surface of a roof of a building and a structure projecting out form the roof surface, the method comprising placing a width of a mesh, having openings and a covering that covers the openings on at least one side of the mesh, over a gap between the surface of the roof and a structure projecting out from the roof surface and the mesh being covered with irregular corrugations having irregular lengths which irregular corrugations are shorter than the width of the mesh and which are irregularly spaced, crepe like, from one another, against the structured roofing tiles on the roof and against the structure projecting out from the roof surface, placing a first width edge of the mesh against the structure projecting out from the roof and covering the gap between the surface of the roof covered with structured roofing tiles and the structure projecting out from the roof surface, placing a second width edge of the mesh against the roof and covering the gap between the surface of the roof and a structure projecting out from the roof surface, and deforming the corrugated mesh by hand by deforming the irregularly spaced corrugations having irregular lengths by deforming the irregular corrugations to extend at least a portion of the corrugations and extend at least a portion of the mesh a substantial percentage of the original length of the mesh along at least one direction of the mesh and thus permanently deforming the mesh by hand in at least one direction and expanding the crepe like mesh permanently by extending the crepe like compressed irregular and short corrugations in at least one direction.

The covering material simultaneously permits ventilation if the flat stock is air permeable. The creped flat stock can easily adapt to changes in the shape and area of the individual openings without tearing.

The covering material is particularly strong if the underside of the substrate also has a coating of flat stock, i.e. the substrate is coated on both sides.

The substrate can be in the form of a grid and made of a ductile material. Grid-like in the context of the invention means a grid with straight or corrugated ribs or a knit.

In the case of a grid with straight ribs, these should run at an angle to the direction of extension. When the material is extended, the position of the ribs can therefore be changed by changing the angle, so that the geometry of the meshes is also changed. The width decreases with increasing length.

Stated another way, where the substrate has mesh formed of substantially straight ribs, the material forming the ribs can be disposed at an angle with respect to the dimension in which the material is extendable. The form of the grid of the substrate material can be in a diamond pattern, having a first axial length in the direction to be extended, and, a second axial length substantially perpendicular to the direction of the first axial length. Upon extension of the material, the first axial length can be increased, and the second axial length can thus decrease.

Because the ribs are corrugated due to the crepe-like compression, extension in one direction without affecting the perpendicular direction is possible.

A rib mesh is a very economical substrate. The present invention preferably has a mesh aperture of approximately 10×5 mm, a rib width of approximately 0.4 mm and a sheet thickness of approximately 0.3 mm.

Aluminum, preferably soft aluminum, is recommended as the corrosion-resistant material for the substrate. If an aluminum rib mesh is used, its ductile properties can be improved by means of soft-annealing.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is described in greater detail below with reference to the attached drawings, wherein.

DESCRIPTION OF THE PREFERRED EMBODIMENT

Figure 1:
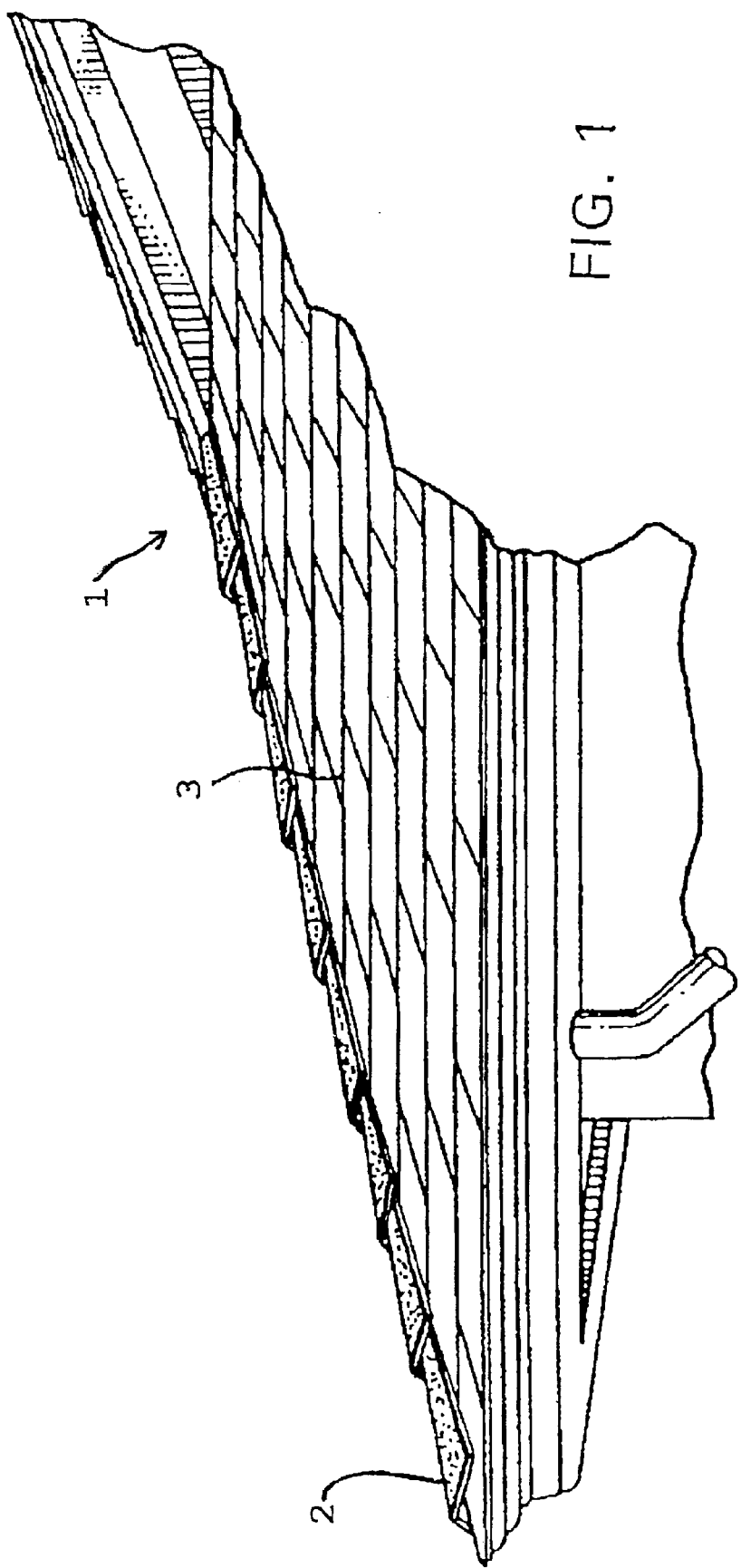
FIG. 1 is a perspective view of a roof.

Referring first to FIG. 1, a roof 1 is shown with a ridge cover 2 and roof covering 3.

Figure 2:
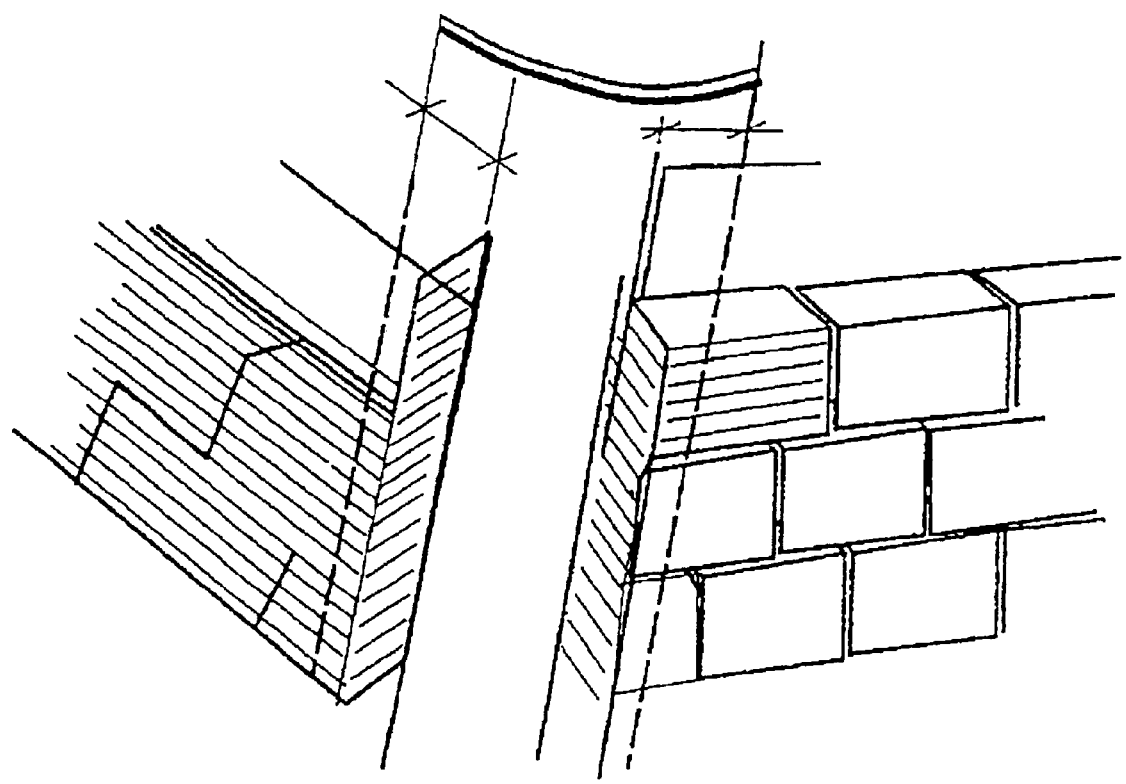
FIG. 2 shows a covering material covering the gap between two different parts.

Referring now to FIG. 2, a covering material 4 is shown covering the gap 5 between a first part 6 and a second part 7.

Figure 3:
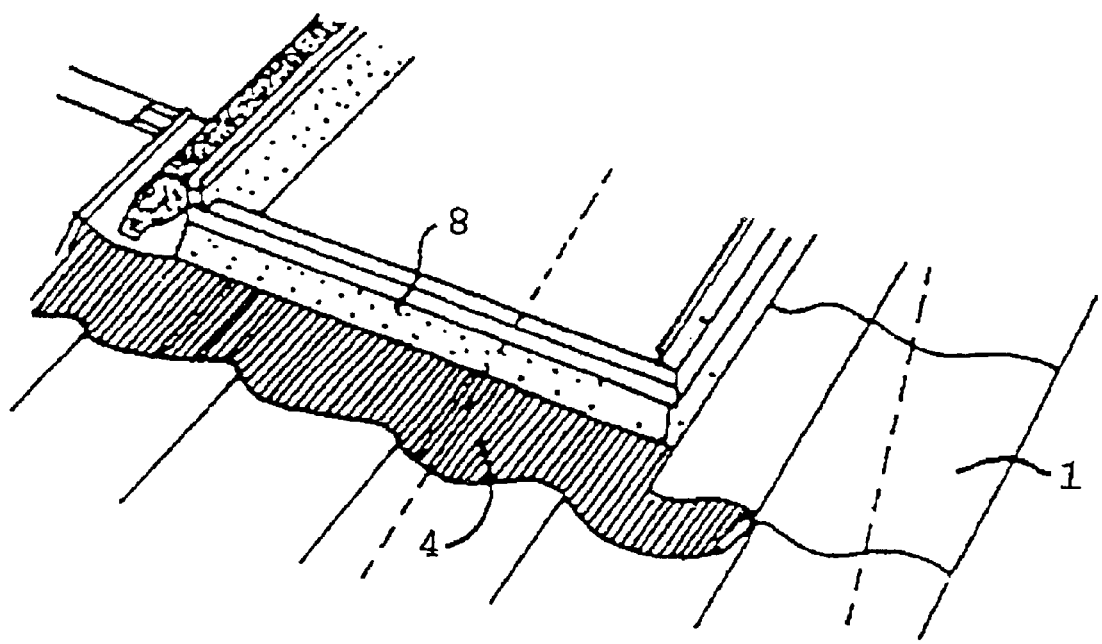
FIG. 3 shows a material placed between a roof and a structure projecting out of the roof.

FIG. 3 shows a material 4 placed between a roof 1 and a structure 8 projecting out of the roof 1.

Figure 4:
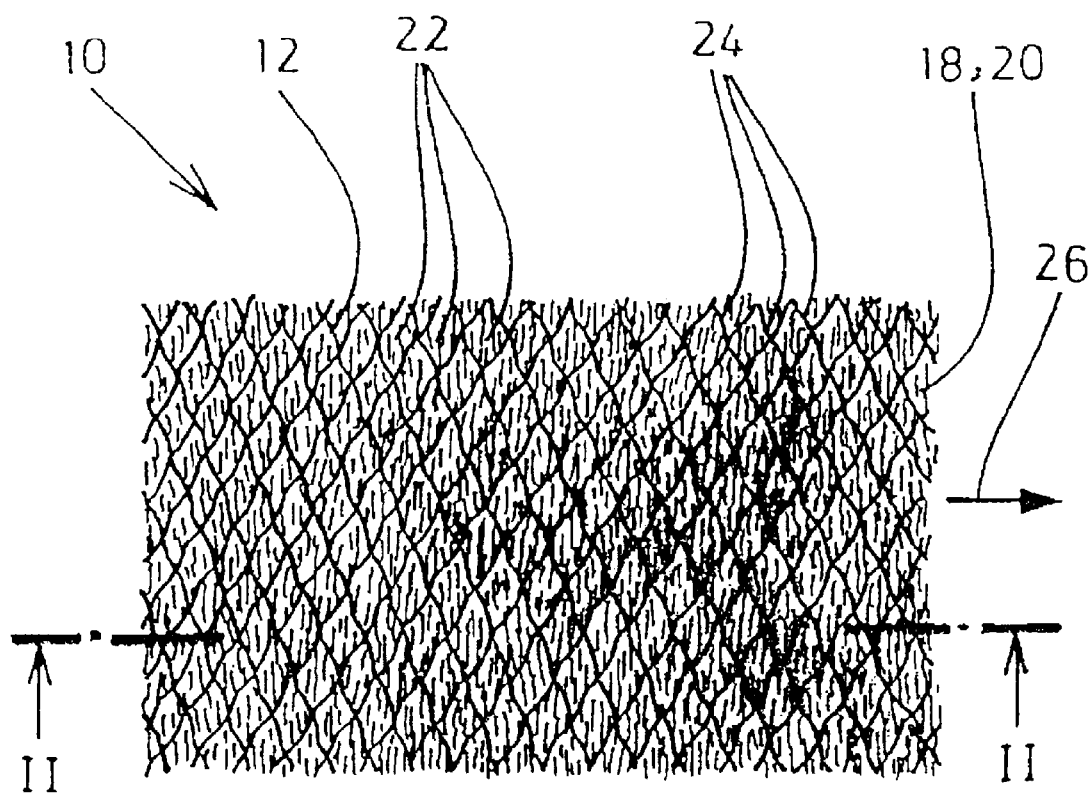
FIG. 4 shows a plan view of the covering material.
Figure 5:
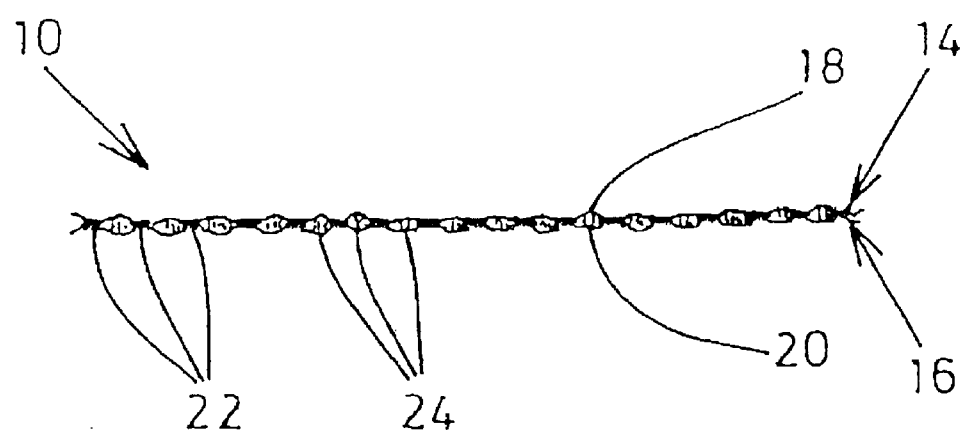
FIG. 5 shows the covering material from FIG. 1 in cross-section along the line II—II.

FIG. 4 and FIG. 5 show the covering material 10 in plan view and in cross-section, respectively. The covering material 10 preferably has a rib mesh as a substrate 12. The covering material 10 can also have a top coating 18 and a bottom coating 20 on its top 14 and bottom 16 sides, respectively, which coatings 18 and 20 can cover openings 22 in the substrate 12.

The rib mesh substrate 12 can have ribs 24. The top coating 18 is of a water-repellant, impregnated non-woven or non-woven material, while the bottom coating 20 is of a non-woven material, fabric or substance. The top coating 18 can be glued, secured or attached to the bottom coating 20 in the area of the openings 22. The coatings 18, 20 can slide along the ribs 24 of the substrate 12. After gluing, the substrate 12 with coatings on both sides is compressed, crepe-like, opposite the direction of extension 26 to about 70% of its original length so that the crêped covering material 10 can be extended by about 40% of its length.

In other words, in one embodiment of the present invention, the coated rib mesh substrate 12 can be compressed in such a way that the ribs 24 are compressed in a crepe-like manner. With such compression, the covering material 10 can later be stretched opposite the original direction of compression, with substantially no corresponding compression in the transverse direction.

One feature of the invention resides broadly in the covering material 10 which can be plastically deformed by hand and extended in at least one direction, having a substrate 12 with openings 22, at least the top side of which substrate 12 has a top coating 18 which covers the openings 22, characterized by the fact that the top coating 18 is of a thin flat stock and that the coated substrate 12 has been compressed, crepe-like, by at least 25% of its original length in the direction opposite the direction of extension 26, so that the covering material 10 has a surface covered with irregular little corrugations.

Another feature of the invention resides broadly in the covering material characterized by the fact that the flat stock is air permeable.

Yet another feature of the invention resides broadly in the covering material characterized by the fact that the flat stock is liquid repellant.

Still another feature of the invention resides broadly in the covering material characterized by the fact that the flat stock of the upper coating 18 is a polyacrylonitrile non-woven.

A further feature of the invention resides broadly in the covering material characterized by the fact that the substrate 12 also has a bottom coating 20 of flat stock on its bottom side 16.

Another feature of the invention resides broadly in the covering material characterized by the fact that the flat stock of the bottom coating 20 is a polyester non-woven.

Yet another feature of the invention resides broadly in the covering material characterized by the fact that the top coating 18 and the bottom coating 20 are connected to one another in the area of the openings 22.

Still another feature of the invention resides broadly in the covering material characterized by the fact that the substrate 12 is a rib mesh.

A further feature of the invention resides broadly in the covering material characterized by the fact that the substrate 12 is aluminum.

Examples of roofing materials in which embodiments of the present invention may possibly be utilized may be found in the following U.S. Pat. Nos. 5,377,459; 5,379,517; 5,380,552; 5,382,449; 5,389,715; 5,395,703; 5,400,558; 5,406,764; 5,414,965; 5,415,511; 5,421,134; 5,426,898; 5,437,923; 5,438,810; 5,440,855; 5,471,801; and 5,474,838.

Examples of polyisobutylene materials which may possibly be used in embodiments of the present invention may be found in the following U.S. Pat. Nos. 5,378,779; 5,389,430; 5,416,176; 5,442,010; 5,442,015; 5,458,796; and 5,461,122.

Examples of crepe-like materials or processes for making crepe-like materials which may possibly be used in embodiments of the present invention may be found in the following U.S. Pat. Nos. 5,394,624; 5,403,446; 5,409,572; 5,417,797; 5,419,464; 5,431,786; and 5,468,796.

Examples of non-woven polyesters which may possibly be used in embodiments of the present invention may be found in the following U.S. Pat. Nos. 5,380,582; 5,415,738; 5,419,953; 5,429,066; 5,445,874; 5,464,096; 5,465,739; 5,470,492; and 5,474,838.

Examples of acroylonitrile non-woven materials which may possibly be incorporated in embodiments of the present invention may be found in the following U.S. Pat. Nos. 5,385,656; 5,385,774; 5,393,845; 5,397,627; 5,401,499; 5,401,576; 5,403,361; 5,410,053; 5,414,216; 5,418,284; 5,426,148; 5,434,205; 5,442,815; 5,443,598; 5,464,465; 5,468,529; and 5,470,485.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The foreign and international patent publication applications, namely, Federal Republic of Germany Patent Application No. 195 04 152.6, filed on Jun. 30, 1995 having inventor Karl-Heinz Hofmann, and DE-OS 195 04 152.6 and DE-PS 195 04 152.6 and International Application No. PCT/DE96/01189 filed on Jun. 27, 1996, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

We now refer again to FIGS. 4 and 5 which show the covering material 10 in plan view and in cross-section, respectively. The covering material 10 preferably has a rib mesh as a substrate 12. The covering material 10 can also have a top coating 18 and a bottom coating 20 on its top 14 and bottom 16 sides, respectively, which coatings 18 and 20 can cover openings 22 in the substrate 12. The rib mesh substrate 12 can have ribs 24. The top coating 18 is of a water-repellant, impregnated polyacrylonitrile non-woven or non-woven material, while the bottom coating 20 is of a polyester non-woven material, fabric or substance. The top coating 18 can be glued, secured or attached to the bottom coating 20 in the area of the openings 22. The coatings 18, 20 can slide along the ribs 24 of the substrate 12. After gluing, the substrate 12 with coatings on both sides is compressed, crepe-like, opposite the direction of extension 26 to about 70% of its original length so that the crêped covering material 10 can be extended by about 40% of its length.

In other words, in one embodiment of the present invention, the coated rib mesh substrate 12 can be compressed in such a way that the ribs 24 are compressed in a crepe-like manner. With such compression, the covering material 10 can later be stretched opposite the original direction of compression, with substantially no corresponding compression in the transverse direction.

The present invention relates to a covering material, which covering material can be plastically deformed by hand and is extendable in at least one direction, having a substrate with openings and a coating on at least its top surface which covers the openings.

Such covering material in the form of sheets, strips or widths is required as covering on the roof of a building, for example, to seal the gap between the surface of the roof covered with structured roofing tiles and a structure projecting out from the roof surface, such as a chimney, a window, a wall, or ventilating pipe, or also the gap between a ridge, an arris or hip, etc. In these cases, the gap between an essentially planar surface or straight edge and a three-dimensional structured surface must be covered so as to be water-tight, whereby the three-dimensional, structured surface is larger than its projection into the plane. The covering must therefore be extendable in at least that region abutting the three-dimensional, structured surface.

DE-A 36 42 063 discloses a covering material having a rib mesh embedded in polyisobutylene as a substrate. When this covering material is extended, the diamond meshes of the substrate deform, whereby the height and aperture of a mesh change in inverse proportion to one another while the lateral lengths remain the same. At the same time, the area of a mesh changes so that the embedding compound is severely deformed and, due to its elastic properties, exerts a restoring force on the rib mesh. This known covering material therefore exhibits undesirable creep, in particular following severe extension, The object of the present invention is to create an economical covering material for covering the gap between a planar surface and a structured surface, in particular a highly structured roof surface, which material can be extended in at least one direction more than 30%, can be bent perpendicular to the direction of extension, and the entire surface of which covering material can be permanently and plastically deformed in three dimensions.

To achieve this object, the present invention teaches that the top coating is of a thin flat stock and that the coated substrate is, at least in the direction opposite the direction of extension, compressed, crepe-like, by at least 25% of its original length so that the surface of the covering material exhibits irregular little corrugations.

As a result of the compression opposite the direction of extension, the covering material can easily be extended in the direction of extension to its original length. The covering material is compressed, crepe-like, by at least that length by which it is to later be extended or extendable. The covering material is preferably compressed by approximately 30–50% of its original length, so that when extended to its original length, it is about 1.5 to 2 times its as-delivered length. The covering material can therefore easily be extended up to 100% of its length, i.e. by a significantly greater amount than can known covering materials. The covering material can be compressed both vertically and horizontally, so that it can be extended in any direction.

The covering material simultaneously permits ventilation if the flat stock is air permeable. A thin non-woven or knit which breathes, permits diffusion and is hydrophobic is particularly well suited to this purpose. The crêped flat stock can easily adapt to changes in the shape and area of the individual openings without tearing.

A liquid-repellant flat stock can prevent water from penetrating the covering. This can also be achieved by an appropriate impregnation, which can also include fungicidal and flame-retardant components.

The covering material can be particularly resistant to weathering and ultraviolet radiation if the flat stock of the top coating is made of a polyacrylonitrile non-woven material, fabric or substance.

The covering material is particularly strong if the underside of the substrate also has a coating of flat stock, i.e. the substrate is coated on both sides.

The flat stock of the bottom coating can be a polyester non-woven material.

The top coating and the bottom coating can be interconnected, e.g. melted or glued together, in the area of the openings or meshes of the substrate. The substrate is thus embedded between the two coatings without being glued directly to them, allowing the coatings to slide over the ribs of the substrate.

The substrate can be in the form of a grid and made of a ductile material. Grid-like in the context of the invention means a grid with straight or corrugated ribs or a knit.

In the case of a grid with straight ribs, these should run at an angle to the direction of extension. When the material is extended, the position of the ribs can therefore be changed by changing the angle, so that the geometry of the meshes is also changed. The width decreases with increasing length.

The covering material can form a hard cover if a hardenable binder is used. This can be a hydraulically hardened binder or a polymerizable plastic.

The present invention relates to a method of covering the gap between the surface of a roof of a building covered with structured roofing tiles and a structure projecting out from the roof surface, such as a chimney, a window, a wall, or a ventilating pipe and also the gap between a ridge, an arris or hip and material for the method.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

One aspect of the invention relates to a building having a roof, the building comprising walls and a roof which is supported by the walls, the roof having sculptured roofing tiles, which form a three dimensional structured surface disposed on the roof, a structure projecting out of a roof, such as a chimney, a window, a wall, or ventilating pipe, a gap between the roof and the structure projecting out from the roofing surface, a rib mesh, having openings and a covering, that covers the openings on at least one side of the rib mesh, being disposed over a gap between the surface of the roof covered with structured roofing tiles and the structure projecting out from the roof surface, the rib mesh being covered with irregular corrugations having irregular lengths which irregular corrugations are shorter than the width of the rib mesh and which irregular corrugations are irregularly spaced, crepe like, from one another, the rib mesh being disposed against the structured roofing tiles on the roof and against the structure projecting out from the roof surface, a first width edge of the rib mesh being disposed against the structure projecting out from the roof and covering the gap between the surfaces of the roof covered with the structured roofing tiles and the structure projecting out from the roof surface, a second width edge of the rib mesh being disposed against the roof and covering the gap between the surfaces of the roof covered with the structured roofing tiles and the structure projecting out from the roof surface, and the corrugated rib mesh comprising a rib mesh deformed by hand, the irregularly spaced hand deformed corrugations having irregular lengths and lying against the structured roofing tiles on the roof and against the structure projecting out from the roof surface, the deformed portions of corrugations being configured to extend at least a portion of the length of the corrugations, at least a portion of the mesh being extended a substantial percentage of the original length of the rib mesh along at least one direction of the rib mesh, the rib mesh being permanently deformed by hand in at least one direction, the crepe like rib mesh being permanently extended, the crepe like corrugations being compressed irregularly, the short corrugations being deformed and elongated in one direction without affecting the direction perpendicular to the one direction, and the rib mesh being extended without a restoring force being set up in the deformed by hand rib mesh, thus avoiding restoring creep in the mesh.

Another aspect of the invention relates to the building having a roof covered with structured roofing tiles and a structure projecting out from the roof surface wherein the expanded rib mesh comprises expanded rib mesh having been expanded a substantial portion of its initial length upon the irregular corrugations having been expanded by hand.

A further aspect of the invention relates to the building having a roof covered with structured roofing tiles and a structure projecting out from the roof surface wherein the crepe like rib mesh is compressed in the direction opposite the direction of extension prior to installation on the roof.

Yet another aspect of the invention relates to the building having a roof covered with structured roofing tiles and a structure projecting out from the roof surface wherein the substrate is configured to have an initial length before compression of the substrate in the direction opposite the direction of extension, and the substrate is compressed at least 25% of the initial length of the rib mesh in the direction opposite the direction of extension prior to installation on the roof.

Still another aspect of the invention relates to the building having a roof covered with structured roofing tiles and a structure projecting out from the roof surface wherein the layer of material comprises a substantially flat stock.

Another feature of the invention relates to the building having a roof covered with structured roofing tiles and a structure projecting out from the roof surface wherein the covering having been compressed prior to installation on the roof.

Yet another feature of the invention relates to the building having a roof covered with structured roofing tiles and a structure projecting out from the roof surface wherein the covering comprises an air permeable and liquid repellant material.

Still another feature of the invention relates to the building having a roof covered with structured roofing tiles and a structure projecting out from the roof surface wherein the covering comprises a first layer disposed on a first side of the mesh, and comprising a second layer disposed on a second side of the mesh, the second layer of material is disposed on the second side of the substrate, irregularly corrugating the first layer from substantially flat stock, irregularly corrugating the second layer from substantially flat stock, and irregularly corrugating the mesh together with the first and the second layer.

A further feature of the invention relates to the building having a roof covered with structured roofing tiles and a structure projecting out from the roof surface wherein, the plurality of openings in the mesh are disposed between the first layer and the second layer, and the mesh comprises means for connecting the first layer and the second layer.

Another aspect of the invention relates to the building having a roof covered with structured roofing tiles and a structure projecting out from the roof surface wherein, the substrate comprises a rib mesh, and the rib mesh comprises aluminum.

Yet another aspect of the invention relates to the building having a roof covered with structured roofing tiles and a structure projecting out from the roof surface wherein, the covering comprises a first layer disposed on a first side of the mesh, and comprising a second layer disposed on a second side of the mesh, the second layer of material is disposed on the second side of the substrate, the first layer having been irregularly corrugated from substantially flat stock, the second layer having been irregularly corrugated from substantially flat stock, and the mesh having been irregularly corrugated together with the first and the second layer.

Still another aspect of the invention relates to a method of constructing a building having a roof covered with structured roofing tiles, which form a three dimensional structured surface, and a structure projecting out from the roof surface, such as a chimney, a window, a wall, or ventilating pipe, the building comprises walls and a roof which is supported by the walls, the roof having sculptured roofing tiles disposed thereon, a structure projecting out of the roof, such as a chimney, a window, a wall, or ventilating pipe, a gap between the roof and the structure projecting out from the roofing surface, a rib mesh, having openings and a covering, that covers the openings on at least one side of the rib mesh, being disposed over the gap between the surface of the roof covered with structured roofing tiles and the structure projecting out from the roof surface, the rib mesh being covered with irregular corrugations having irregular lengths which irregular corrugations are shorter than the width of the rib mesh and which are irregularly spaced, crepe like, from one another, the rib mesh being disposed against the structured roofing tiles on the roof and against the structure projecting out from the roof surface, a first width edge of the rib mesh being disposed against the structure projecting out from the roof and covering the gap between the surfaces of the roof covered with the structured roofing tiles and the structure projecting out from the roof surface, a second width edge of the rib mesh being disposed against the roof and covering the gap between the surfaces of the roof covered with the structured roofing tiles and the structure projecting out from the roof surface, and the corrugated rib mesh comprising a rib mesh deformed by hand, the irregularly spaced hand deformed corrugations having irregular lengths and lying against the structured roofing tiles on the roof and against the structure projecting out from the roof surface, the deformed portions of corrugations being configured to extend at least a portion of the length of the corrugations, at least a portion of the mesh being extended a substantial percentage of the original length of the rib mesh along at least one direction of the rib mesh, the rib mesh being permanently deformed by hand in at least one direction, the crepe like rib mesh being permanently extended, the crepe like corrugations being compressed irregularly, the short corrugations being deformed and elongated in one direction without affecting the direction perpendicular to the one direction, and the rib mesh being extended without a restoring force being set up in the deformed by hand rib mesh, thus avoiding restoring creep in the mesh, the method also comprising placing a width of a rib mesh, having openings and a covering that covers the openings on at least one side of the rib mesh, over a gap between the surface of the roof covered with structured roofing tiles and a structure projecting out from the roof surface and the rib mesh being covered with irregular corrugations having irregular lengths which irregular corrugations are shorter than the width of the rib mesh and which are irregularly spaced, crepe like, from one another, against the structured roofing tiles on the roof and against the structure projecting out from the roof surface, placing a first width edge of the rib mesh against the structure projecting out from the roof and covering the gap between the surface of the roof covered with structured roofing tiles, which form a three dimensional structured surface and the structure projecting out from the roof surface substantially simultaneously, placing a second width edge of the rib mesh against the roof and covering the gap between the surface of the roof covered with structured roofing tiles and a structure projecting out from the roof surface substantially simultaneously, and deforming the corrugated rib mesh by hand by deforming the irregularly spaced corrugations having irregular lengths, by deforming the irregular corrugations to extend at least a portion of the corrugations, and extend at least a corresponding portion of the mesh a substantial percentage of the original length of the rib mesh along at least one direction of the rib mesh and thus permanently deforming the rib mesh by hand in at least one direction and expanding the crepe like mesh permanently by extending the crepe like compressed irregular and short corrugations in one direction without affecting the direction perpendicular to the one direction, and without a restoring force being set up in the mesh which mesh was deformed by hand, thus avoiding restoring creep in the mesh.

Still another aspect of the invention relates to the method of constructing a building having a roof covered with structured roofing tiles, which form a three dimensional structured surface, and a structure projecting out from the roof surface, such as a chimney, a window, a wall, or ventilating pipe wherein the expanding comprising expanding at least a portion of the corrugated, crepe like mesh a substantial portion of its initial length by expanding the irregular corrugations by hand.

A further feature of the invention relates to the method of constructing a building having a roof covered with structured roofing tiles, which form a three dimensional structured surface, and a structure projecting out from the roof surface, such as a chimney, a window, a wall, or ventilating pipe including compressing the crepe like rib mesh in the direction opposite the direction of extension prior to installation on the roof.

Another feature of the invention relates to the method of constructing a building having a roof covered with structured roofing tiles, which form a three dimensional structured surface, and a structure projecting out from the roof surface, such as a chimney, a window, a wall, or ventilating pipe wherein the substrate is configured to have an initial length before compression of the substrate in the direction opposite the direction of extension, and compressing at least 25% of the initial length of the rib mesh in the direction opposite the direction of extension prior to installation on the roof.

Still another feature of the invention relates to the method of constructing a building having a roof covered with structured roofing tiles, which form a three dimensional structured surface, and a structure projecting out from the roof surface, such as a chimney, a window, a wall, or ventilating pipe wherein the layer of material comprises a substantially flat stock.

Yet another feature of the invention relates to the method of constructing a building having a roof covered with structured roofing tiles, which form a three dimensional structured surface, and a structure projecting out from the roof surface, such as a chimney, a window, a wall, or ventilating pipe including compressing the covering from a substantially flat stock while mounted on the rib mesh prior to installation on the roof.

A further feature of the invention relates to the method of constructing a building having a roof covered with structured roofing tiles, which form a three dimensional structured surface, and a structure projecting out from the roof surface, such as a chimney, a window, a wall, or ventilating pipe wherein compressing the covering from comprises an air permeable and liquid repellant material.

Another aspect of the invention relates to the method of constructing a building having a roof covered with structured roofing tiles, which form a three dimensional structured surface, and a structure projecting out from the roof surface, such as a chimney, a window, a wall, or ventilating pipe wherein the covering comprises a first layer disposed on a first side of the mesh, and comprising a second layer disposed on a second side of the mesh, the second layer of material is disposed on the second side of the substrate, irregularly corrugating the first layer from substantially flat stock, irregularly corrugating the second layer from substantially flat stock, and irregularly corrugating the mesh together with the first and the second layer.

Yet another aspect of the invention relates to the method of constructing a building having a roof covered with structured roofing tiles, which form a three dimensional structured surface, and a structure projecting out from the roof surface, such as a chimney, a window, a wall, or ventilating pipe wherein the plurality of openings in the mesh are disposed between the first layer and the second layer, and the mesh comprises means for connecting the first layer and the second layer.

A further feature of the invention relates to the method of constructing a building having a roof covered with structured roofing tiles, which form a three dimensional structured surface, and a structure projecting out from the roof surface, such as a chimney, a window, a wall, or ventilating pipe wherein the substrate comprises a rib mesh, and the rib mesh comprises aluminum.

Another aspect of the invention relates to the building roof covering for covering a roof of a building covered with structured roofing tiles, which form a three dimensional structured roof surface, and a structure projecting out from the roof surface, such as a chimney, a window, a wall, or ventilating pipe, the building roof covering comprising a mesh for covering a gap between a roof which is supported by walls, which roof has sculptured roofing tiles, which tiles form a three dimensional structured surface disposed on a roof, and a structure projecting out of a roof, such as a chimney, a window, a wall, or ventilating pipe, the mesh, having openings and a covering, that covers the openings on at least one side of the mesh, the mesh being configured to be disposed over a gap between the surface of a roof covered with structured roofing tiles and a structure projecting out from a roof surface, such as a chimney, a window, a wall, or ventilating pipe, the mesh being covered with irregular corrugations having irregular lengths which irregular corrugations are shorter than the width of the mesh and which irregular corrugations are irregularly spaced, crepe like, from one another, the mesh being configured to be disposed against a structured roofing tile on a roof and against a structure projecting out from a roof surface, such as a chimney, a window, a wall, or ventilating pipe, a first width edge of the covering being configured to be disposed against a structure projecting out from a roof and covering a gap between the surfaces of a roof covered with structured roofing tiles and a structure projecting out from a roof surface, a second width edge of the covering being configured to be disposed against a roof and covering a gap between the surfaces of a roof covered with structured roofing tiles and a structure projecting out from the roof surface, and the corrugated mesh comprising a mesh configured to be deformed by hand, the irregularly spaced corrugations having irregular lengths and configured to lie against the structured roofing tiles on the roof and against the structure projecting out from the roof surface, the corrugated mesh being configured to be deformable and being configured to be extendable upon deformation by hand, the mesh being configured to be extendable at least a portion of a substantial percentage of the original length of the mesh along at least one direction of the mesh, the mesh being configured to be permanently deformed by hand in at least one direction, the crepe like mesh being configured to be permanently extended upon being deformed by hand, the short corrugations being configured to be deformed and being configured to be elongated in one direction without affecting the direction perpendicular to the one direction, and the mesh being configured to be extended without a restoring force being set up in the deformed by hand mesh, thus avoiding restoring creep in the mesh.

Yet another aspect of the invention relates to the building roof covering for covering a roof of a building, the building roof covering comprising a layer, having openings and a covering, that covers the openings on at least one side of the layer, the layer being covered with irregular corrugations having irregular lengths which irregular corrugations are shorter than the width of the layer and which irregular corrugations are irregularly spaced, crepe like, from one another, the corrugated layer comprising a layer configured to be deformed by hand, and the corrugated layer being configured to be extendable at least a portion of a substantial percentage of the original length of the layer along at least one direction of the layer, and being configured to be permanently deformable and extendable in the at least one direction of the layer and being configured to be extended upon deformation by hand.

A further aspect of the invention relates to the method of covering the gap between the surface of a roof of a building and a structure projecting out form the roof surface, the method comprising placing a width of a mesh, having openings and a covering that covers the openings on at least one side of the mesh, over a gap between the surface of the roof and a structure projecting out from the roof surface and the mesh being covered with irregular corrugations having irregular lengths which irregular corrugations are shorter than the width of the mesh and which are irregularly spaced, crepe like, from one another, against the structured roofing tiles on the roof and against the structure projecting out from the roof surface, placing a first width edge of the mesh against the structure projecting out from the roof and covering the gap between the surface of the roof covered with structured roofing tiles and the structure projecting out from the roof surface, placing a second width edge of the mesh against the roof and covering the gap between the surface of the roof and a structure projecting out from the roof surface, and deforming the corrugated mesh by hand by deforming the irregularly spaced corrugations having irregular lengths by deforming the irregular corrugations to extend at least a portion of the corrugations and extend at least a portion of the mesh a substantial percentage of the original length of the mesh along at least one direction of the mesh and thus permanently deforming the mesh by hand in at least one direction and expanding the crepe like mesh permanently by extending the crepe like compressed irregular and short corrugations in at least one direction.

The invention as described hereinabove in the context of the preferred embodiments is not to be taken as limited to all of the provided details thereof, since modifications and variations thereof may be made without departing from the spirit and scope of the invention.

What is claimed is:

1. A building having a roof;
    said building comprising walls and a roof which is supported by said walls;
    said roof having sculptured roofing tiles, which form a three dimensional structured surface disposed on said roof;
    a structure projecting out of said roof, such as a chimney, a window, a wall, or ventilating pipe;
    a gap between said roof and said structure projecting out from said roofing surface;
    a rib mesh, having openings and a covering that covers said openings on at least one side of said rib mesh, being disposed over said gap between the surface of the roof covered with structured roofing tiles and said structure projecting out from the roof surface;
    said rib mesh being covered with irregular corrugations having irregular lengths which irregular corrugations are shorter than the width of the rib mesh and which irregular corrugations are irregularly spaced, crepe like, from one another;
    said rib mesh being disposed against the structured roofing tiles on the roof and against the structure projecting out from the roof surface;
    a first width edge of said rib mesh being disposed against the structure projecting out from the roof and covering the gap between the surfaces of the roof covered with said structured roofing tiles and said structure projecting out from the roof surface;
    a second width edge of said rib mesh being disposed against the roof and covering the gap between the surfaces of the roof covered with said structured roofing tiles and said structure projecting out from the roof surface; and
    said corrugated rib mesh comprising a rib mesh deformed by hand;
    said irregularly spaced hand deformed corrugations having irregular lengths and lying against said structured roofing tiles on the roof and against the structure projecting out from the roof surface;
    said deformed portions of corrugations being configured to extend at least a portion of the length of said corrugations;
    at least a portion of said mesh being extended a substantial percentage of the original length of said rib mesh along at least one direction of said rib mesh;
    said rib mesh being permanently deformed by hand in at least one direction;
    said crepe like rib mesh being permanently extended;
    said crepe like corrugations being compressed irregularly;
    said short corrugations being generally parallel and being configured to be deformed and elongated in one direction without affecting the direction perpendicular to said one direction; and
    said rib mesh being extended without a restoring force being set up in said deformed by hand rib mesh, thus avoiding restoring creep in said mesh.

2. The building having a roof covered with structured roofing tiles and a structure projecting out from the roof surface according to claim 1 wherein:
    said expanded rib mesh comprises expanded rib mesh having been expanded a substantial portion of its initial length upon said irregular corrugations having been expanded by hand.

3. The building having a roof covered with structured roofing tiles and a structure projecting out from the roof surface according to claim 2 wherein said crepe like rib mesh is compressed in the direction opposite the direction of extension prior to installation on the roof.

4. The building having a roof covered with structured roofing tiles and a structure projecting out from the roof surface according to claim 3 wherein:
    said rib mesh is configured to have an initial length before compression of said rib mesh in the direction opposite the direction of extension; and
    said rib mesh is compressed at least 25% of the initial length of said rib mesh in the direction opposite the direction of extension prior to installation on the roof.

5. The building having a roof covered with structured roofing tiles and a structure projecting out from the roof surface according to claim 4 wherein said layer of material comprises a substantially flat stock.

6. The building having a roof covered with structured roofing tiles and a structure projecting out from the roof surface according to claim 5 wherein said covering having been compressed prior to installation on the roof.

7. The building having a roof covered with structured roofing tiles and a structure projecting out from the roof surface according to claim 6 wherein said covering comprises an air permeable and liquid repellant material.

8. The building having a roof covered with structured roofing tiles and a structure projecting out from the roof surface according to claim 7 wherein:
    said covering comprises a first layer disposed on a first side of said mesh and a second layer disposed on a second side of said mesh;
    said second layer of material is disposed on said second side of said rib mesh;
    irregularly corrugating said first layer from substantially flat stock;
    irregularly corrugating said second layer from substantially flat stock; and
    irregularly corrugating said mesh together with said first and said second layer.

9. The building having a roof covered with structured roofing tiles and a structure projecting out from the roof surface according to claim 8 wherein:
    the plurality of openings in said mesh are disposed between said first layer and said second layer; and said mesh comprises means for connecting said first layer and said second layer.

10. The building having a roof covered with structured roofing tiles and a structure projecting out from the roof surface according to claim 9 wherein:

said rib mesh comprises aluminum.

11. The building having a roof covered with structured roofing tiles and a structure projecting out from the roof surface according to claim 1 wherein:

said covering comprises a first layer disposed on a first side of said mesh, and comprising a second layer disposed on a second side of said mesh;

said second layer of material is disposed on said second side of said rib mesh;

said first layer having been irregularly corrugated from substantially flat stock;

said second layer having been irregularly corrugated from substantially flat stock; and said mesh having been irregularly corrugated together with said first and said second layer.

12. A method of constructing a building having a roof covered with structured roofing tiles, which form a three dimensional structured surface, and a structure projecting out from the roof surface, such as a chimney, a window, a wall, or ventilating pipe, said building comprises:

walls and a roof which is supported by said walls;

said roof having sculptured roofing tiles disposed thereon;

a structure projecting out of said roof, such as a chimney, a window, a wall, or ventilating pipe;

a gap between said roof and said structure projecting out from said roofing surface;

a rib mesh, having openings, and a covering that covers said openings on at least one side of said rib mesh, being disposed over said gap between the surface of the roof covered with structured roofing tiles and said structure projecting out from the roof surface;

said rib mesh being covered with irregular corrugations having irregular lengths which irregular corrugations are shorter than the width of the rib mesh and which are irregularly spaced, crepe like, from one another;

said rib mesh being disposed against the structured roofing tiles on the roof and against the structure projecting out from the roof surface;

a first width edge of said rib mesh being disposed against the structure projecting out from the roof and covering the gap between the surfaces of the roof covered with said structured roofing tiles and said structure projecting out from the roof surface;

a second width edge of said rib mesh being disposed against the roof and covering the gap between the surfaces of the roof covered with said structured roofing tiles and said structure projecting out from the roof surface; and said corrugated rib mesh comprising a rib mesh deformed by hand;

said irregularly spaced hand deformed corrugations having irregular lengths and lying against said structured roofing tiles on the roof and against the structure projecting out from the roof surface;

said deformed portions of corrugations being configured to extend at least a portion of the length of said corrugations;

at least a portion of said mesh being extended a substantial percentage of the original length of said rib mesh along at least one direction of said rib mesh;

said rib mesh being permanently deformed by hand in at least one direction;

said crepe like rib mesh being permanently extended;

said crepe like corrugations being compressed irregularly;

said short corrugations being generally parallel and being configured to be deformed and elongated in one direction without affecting the direction perpendicular to said one direction; and said rib mesh being extended without a restoring force being set up in said deformed by hand rib mesh, thus avoiding restoring creep in said mesh;

said method comprising:

placing a width of a rib mesh, having openings and a covering that covers said openings on at least one side of said rib mesh, over a gap between the surface of the roof covered with structured roofing tiles and a structure projecting out from the roof surface and said rib mesh being covered with irregular corrugations having irregular lengths which irregular corrugations are shorter than the width of the rib mesh and which are irregularly spaced, crepe like, from one another, against the structured roofing tiles on the roof and against the structure projecting out from the roof surface;

placing a first width edge of said rib mesh against the structure projecting out from said roof and covering the gap between the surface of the roof covered with structured roofing tiles, which form a three dimensional structured surface and the structure projecting out from the roof surface substantially simultaneously;

placing a second width edge of said rib mesh against the roof and covering the gap between the surface of the roof covered with structured roofing tiles and a structure projecting out from the roof surface substantially simultaneously; and deforming said corrugated rib mesh by hand by deforming said irregularly spaced corrugations having irregular lengths, by deforming said irregular corrugations to extend at least a portion of said corrugations, and extend at least a corresponding portion of said mesh a substantial percentage of the original length of said rib mesh along at least one direction of said rib mesh and thus permanently deforming said rib mesh by hand in at least one direction and expanding the crepe like mesh permanently by extending said generally parallel, crepe like compressed irregular and short corrugations in one direction without affecting the direction perpendicular to said one direction, and without a restoring force being set up in said mesh which mesh was deformed by hand, thus avoiding restoring creep in said mesh.

13. The method of constructing a building having a roof covered with structured roofing tiles, which form a three dimensional structured surface, and a structure projecting out from the roof surface, such as a chimney, a window, a wall, or ventilating pipe according to claim 12 wherein:

said expanding comprising expanding at least a portion of said corrugated, crepe like mesh a substantial portion of its initial length by expanding said irregular corrugations by hand.

14. The method of constructing a building having a roof covered with structured roofing tiles, which form a three dimensional structured surface, and a structure projecting out from the roof surface, such as a chimney, a window, a wall, or ventilating pipe according to claim 13 including compressing said crepe like rib mesh in the direction opposite the direction of extension prior to installation on the roof.

15. The method of constructing a building having a roof covered with structured roofing tiles, which form a three dimensional structured surface, and a structure projecting out from the roof surface, such as a chimney, a window, a wall, or ventilating pipe according to claim 14 wherein:

said rib mesh is configured to have an initial length before compression of said rib mesh in the direction opposite the direction of extension; and compressing at least 25% of the initial length of said rib mesh in the direction opposite the direction of extension prior to installation on the roof.

16. The method of constructing a building having a roof covered with structured roofing tiles, which form a three dimensional structured surface, and a structure projecting out from the roof surface, such as a chimney, a window, a wall, or ventilating pipe according to claim 15 wherein said layer of material comprises a substantially flat stock.

17. The method of constructing a building having a roof covered with structured roofing tiles, which form a three dimensional structured surface, and a structure projecting out from the roof surface, such as a chimney, a window, a wall, or ventilating pipe according to claim 16 including compressing said covering from a substantially flat stock while mounted on said rib mesh prior to installation on the roof.

18. The method of constructing a building having a roof covered with structured roofing tiles, which form a three dimensional structured surface, and a structure projecting out from the roof surface, such as a chimney, a window, a wall, or ventilating pipe according to claim 17 wherein compressing said covering from comprises an air permeable and liquid repellant material.

19. The method of constructing a building having a roof covered with structured roofing tiles, which form a three dimensional structured surface, and a structure projecting out from the roof surface, such as a chimney, a window, a wall, or ventilating pipe according to claim 18 wherein:

said covering comprises a first layer disposed on a first side of said mesh; and comprising a second layer disposed on a second side of said mesh;.

said second layer of material is disposed on said second side of said rib mesh;

irregularly corrugating said first layer from substantially flat stock;

irregularly corrugating said second layer from substantially flat stock; and irregularly corrugating said mesh together with said first and said second layer.

20. The method of constructing a building having a roof covered with structured roofing tiles, which form a three dimensional structured surface, and a structure projecting out from the roof surface, such as a chimney, a window, a wall, or ventilating pipe according to claim 19 wherein:

the plurality of openings in said mesh are disposed between said first layer and said second layer; and said mesh comprises means for connecting said first layer and said second layer.

21. The method of constructing a building having a roof covered with structured roofing tiles, which form a three dimensional structured surface, and a structure projecting out from the roof surface, such as a chimney, a window, a wall, or ventilating pipe according to claim 20 wherein:

said substrate comprises a rib mesh; and said rib mesh comprises aluminum.

22. A building roof covering for covering a roof of a building, said building roof covering comprising:

a layer, having openings, and a covering that covers said openings on at least one side of said layer;

said building roof covering being covered with irregular corrugations having irregular lengths which irregular corrugations are shorter than the width of the building roof covering and which irregular corrugations are disposed generally parallel and are irregularly spaced, crepe like, from one another;

said corrugated building roof covering being configured to be deformed by hand; and said corrugated building roof covering being configured to be extendable at least a portion of a substantial percentage of the original length of said building roof covering along one direction of said building roof covering, and being configured to be permanently deformable and extendable in said one direction of said building roof covering and being configured to be extended upon deformation by hand.

23. A method of making a building roof covering, said method comprising the step of:

irregularly corrugating a layer, having openings, together with a covering that covers said openings on at least one side of said layer, with irregular corrugations having irregular lengths, which irregular corrugations are shorter than the width of the building roof covering and are irregularly spaced, crepe like, from one another, to produce a corrugated building roof covering being configured to be permanently deformed and extended by hand in said at least one direction of said building roof covering.

24. A building roof covering comprising:

a layer having openings;

a covering that covers said openings on at least one side of said layer;

said layer and said covering being corrugated together;

said building roof covering comprising irregular corrugations having irregular lengths, which irregular corrugations are shorter than the width of the building roof covering and are irregularly spaced, crepe like, from one another; and said building roof covering being configured to be deformed and extended by hand in at least one direction.

* * * * *

UNITED STATES PATENT AND TRADEMARK OFFICE
CERTIFICATE OF CORRECTION

PATENT NO. : 6,502,353 B2
DATED : January 7, 2003
INVENTOR(S) : Karl-Heinz Hofmann It is certified that error appears in the above-identified patent and that said Letters Patent is hereby corrected as shown below:

Title page,
Item [63], Related U.S. Application Data, delete "Continuation of application No. 08/996,827, filed as application No. PCT/DE96/01189 on Dec. 23, 1997, now Pat. No. 6,258,439." and insert -- Continuation of application No. 08/996,827, which was a continuation-in-part of application No. PCT/DE96/01189, now Pat. No. 6,258,439. --.

Signed and Sealed this

Thirtieth Day of December, 2003

JAMES E. ROGAN
*Director of the United States Patent and Trademark Office*